United States Patent [19]

Schwan

[11] Patent Number: 4,971,642

[45] Date of Patent: Nov. 20, 1990

[54] METHOD OF MAKING A SANDWICH LIGHTWEIGHT CONSTRUCTION MATERIAL

[75] Inventor: Rüdiger Schwan, Fulda, Fed. Rep. of Germany

[73] Assignee: Mehler Vario System GmbH, Fulda, Fed. Rep. of Germany

[21] Appl. No.: 280,010

[22] Filed: Dec. 5, 1988

[30] Foreign Application Priority Data

Dec. 15, 1987 [DE] Fed. Rep. of Germany ....... 3742400

[51] Int. Cl.$^5$ .............................................. B32B 31/14
[52] U.S. Cl. ...................................... 156/85; 156/148; 428/225; 428/257; 428/273; 428/286; 428/287; 428/296
[58] Field of Search ................... 156/85, 148; 428/225, 428/257, 260, 272, 273, 286, 287, 296; 139/20, 304; 405/32

[56] References Cited

U.S. PATENT DOCUMENTS

| | | | |
|---|---|---|---|
| 3,207,185 | 9/1965 | Koppelman et al. ................ | 139/304 |
| 3,670,504 | 6/1972 | Hayes et al. ........................... | 405/32 |
| 3,719,545 | 3/1973 | Lawler .................................. | 156/85 |
| 4,336,296 | 6/1982 | Fukuta et al. ......................... | 428/257 |
| 4,389,447 | 6/1983 | Disselbeck et al. .................. | 428/257 |
| 4,395,336 | 7/1983 | Eng ...................................... | 428/257 |
| 4,759,976 | 7/1988 | Dutt ...................................... | 428/257 |

*Primary Examiner*—Caleb Weston
*Attorney, Agent, or Firm*—Jack Schuman

[57] ABSTRACT

Method of making a sandwich lightweight construction material in which double fabric constituting the two sides of the construction material is made from fibers or yarns which consist of at least one polymer consolidating under heat, and pile threads forming the core material in the double fabric are interposed between and connected to the two sides of the construction material. The double fabric may comprise high-temperature-resistant polymer, and may further comprise inorganic fibers or yarns. The double fabric may be pretempered at temperatures below the glass transition temperature of the amorphous material of the polymer. The double fabric is thereafter subject to a heat or temperature treatment so that the fabric consolidates. The sandwich lightweight construction material made according to the disclosure can be used in all cases where low weight and high mechanical stability are important, particularly in aircraft construction.

3 Claims, 1 Drawing Sheet

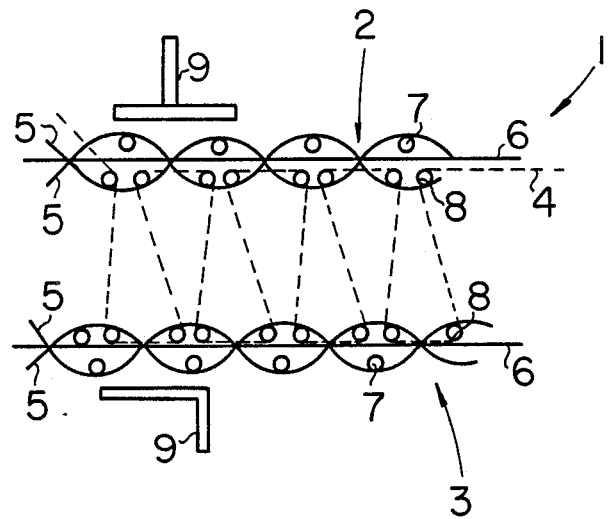

METHOD OF MAKING A SANDWICH LIGHTWEIGHT CONSTRUCTION MATERIAL

BACKGROUND OF THE INVENTION (1) Field of the Invention

The invention relates to a method of making a sandwich lightweight construction material.

(2) Description of the Prior Art

Lightweight constructional building materials are used in all cases where a design saving material is important, i.e. a low weight. Lightweight construction materials are therefore mainly employed in aircraft or vehicle construction but are also used in structural engineering. Apart from the saving in weight however, the mechanical stability, i.e. the strength, loadability and resistance to torsion are further essential demands made of lightweight construction materials.

The necessary mechanical stability is employed by the socalled sandwich construction in which two thin loadbearing cover layers are employed which are joined together via a thicker but lighter core material.

Depending on the field of use these covering or top layers consist of metal, plywood or fibre-reinforced synthetic materials; as fillers, hard foams, balsa wood or honeycomb cores of a great variety of materials are used as well as filigrane materials with network structure. Said honeycomb or network structure is made from warp knit fabrics impregnated with synthetic resin by deep drawing.

It is further known to employ nonwoven fabric or needle felt of high pore volume as core material.

With this method of construction weight-related strengths can be achieved which are several times greater than the values of steel. However, these structures do not always meet all the requirements as regards fire behaviour, deformability, strength and toxic behaviour.

A further disadvantage resides in that the core material must be joined to the cover layers for example by adhering so that in the manufacturing of the sandwich component an additional working operation is necessary. The nature of the joining of the core material and cover layers also decisively influences the mechanical stability of the entire construction component so that the requirements cannot be met frequently precisely as regards the resistance to torsion and twisting. This is the case in particular when a honeycomb structure is used as core material which as binding area has only the thin webs of the honeycomb walls perpendicular to the covering layer.

U.S. Pat. No. 4,336,296 discloses a three-dimensional fabric which to increase the stability is dipped into a plastic composition which serves to stick the individual filaments together. In this manner a flexible structure is obtained which is used for making vehicle tires. This fabric cannot be employed as lightweight construction material.

GB-PS NO. 990,554 discloses a two-layer fabric in which the two layers are joined together via pile threads. For example, to obtain stable boards this double fabric is impregnated with a thermosetting synthetic resin which sets in the subsequent heat treatment. A disadvantage here is the additional working step of the impregnation.

U.S. Pat. No. 3,670,504 describes a double fabric of polymers in which the pile threads are spaced apart far enough for the double fabric to be filled with concrete. It is the filling material which imparts stability to the fabric.

U.S. Pat. No. 3,207,185 discloses boards which consist of a double fabric and in which the joining between the upper and lower fabrics does not consist of through individual threads but of the same fabric as the covering layers. Special machines are therefore required for the manufacture. For consolidating the fabric made from polymers, said fabric is also impregnated with a synthetic resin which subsequently sets in a heat treatment.

SUMMARY OF THE INVENTION

The problem underlying the invention is therefore to make available a method of manufacturing a sandwich lightweight construction material which can be carried out more simply, rapidly and economically than the known methods, the lightweight construction material obtained having at least the same values as regards strength, rigidity, torsion resistance, density and fire behaviour as the known sandwich construction materials.

DESCRIPTION OF THE DRAWING

The one FIGURE represents a partially diagrammatic view in section of the sandwich lightweight construction material made according to the invention.

DESCRIPTION OF THE PREFERRED EMBODIMENT

This problem is solved by a method in which the double fabric is made from fibres or yarns which consist of at least one polymer consolidating or setting under heat and in which the double fabric is subjected to a temperature aftertreatment such that the fabric consolidates. This method has the advantage that the additional method step of impregnation with a thermosetting synthetic resin is eliminated, thereby substantially shortening the production method.

To obtain certain end product properties adapted to the specific intended use fibre types are preferably used which are distinguished by specific glass transition temperatures and melting and decomposition temperatures.

Preferably, fibres are used without melting point and unpronounced two-phase structure. All polymers are suitable which can be processed to fibres or yarns, i.e. polycondensate and polyadditional products, such as polyesters or polyamides, or polymers such as polypropylene, polyacrylonitrile or polytetrafluoroethyl.

If the building or construction material is to be used in fire-hazard areas high-temperature-resistant polymers are suitable. These include homocyclic and heterocyclic polymers, in particular fully aromatic polyamides (aramides), fully aromatic polyamides and "ordered polyamides" (copolyamides), polyamides containing heterocyclene, heterocyclic polyamides with ordered structure, polymers of readily soluble heterocyclic polyamides, fibres of polyheterocyclene, polyimides, polyimidamides, polybenzimidazoles, polyphenyl quinoxalines, polyacrylene ethers, polyoxydiazoles, polytriazoles, polythiadiazoles, polybenzoxazoles and polyquinazolindiones. Furthermore, the double fabric may comprise ladder polymers, in particular poly to benzimidazolbenzophenanthroline or other high-temperature-resistant polymers such as polytheraphtaloyl oxalamidrazone, poly-2,6-diphenyl-p-phenylene oxide or phenol formaldehyde.

According to the further embodiment in addition to the polymer fibres inorganic fibres such as mineral fibres, carbon fibres, polycrystalline inorganic fibres, whiskers or metal fibres may be woven in. A sandwich lightweight construction material provided with such inorganic fibres is in particular advantageous for the initial production and refitting in future inspections of aircraft because in future the thermoplasts hitherto used for side linings, wall linings, ceiling boards, textile-covered parts, such as foot strips and separating walls, and stowage flaps and air supply conduits must be replaced by lightweight construction materials which must withstand the Heat Release Test (Test No. 14 CFR, Part 25 and 121, No. 24595, No. 25–61 and 121–189) developed by the Ohio State University.

A sandwich board according to the invention of polyimide fibres with organic fibre component having the dimensions 150×150 mm was irradiated in accordance with the test stipulations in a heating chamber by a heat source with a power of 3.5 W/cm$^2$ for five minutes. At the heating chamber outlet values of $\leq$65 kW/m$^2$ were measured, thereby fulfilling the test requirements.

According to a further embodiment polymer fibres or polymer yarns with high modulus of elasticity are employed.

The following polymers can possibly be used: poly-p-benzamide, poly-p-phenylene terephthalamide, aromatic polyamide hydrazide, polyethylene naphthalate, polyethylene diphenoxydicarboxylate and polyphenylene sulfide.

With the enumerated partially crystalline synthetic fibres which are made from homopolymers, by the specific spinning, drawing and aftertreatment technology a physically modified form is achieved which permits their use in the lightweight construction material.

Chemically modified fibres may also be used when copolymers with reduced crystallization readiness or preferably amorphous fibres which even after the temperature treatment adapted to the specific polymer still largely retain an amorphous structure.

For particular uses resins may also be incorporated in the double fabric.

The sandwich lightweight construction material may also comprise a great variety of combinations of said polymer fibres or polymer yarns. The fabric may be additionally stabilized by plastic addition or impregnation.

According to the invention the individual core diameters preferably lie between 1 and 1000 μm and the fineness of the yarns used lies preferably between 10 dtex and 2200 dtex.

An additional lamination with further covering sheets may in most cases be omitted due to the pleasant widely variable covering surface structure achieved in the production itself. A further advantage with this lightweight construction material is that said material can be adapted to the constructional requirements of the component production. The lightweight construction material can be worked and reformed as desired although it has a multiorientated structure. This means that a variable construction is possible within wide limits in which the anisotropy of the mechanical and physical properties can be specifically incorporated into the construction taking account of possible chemical reactions in the material or with other materials or also with the atmosphere.

Furthermore, depending on the nature of the fibres or yarns employed the lightweight construction material is gas, steam or liquid permeable. This opens up completely new fields of use.

According to a preferred embodiment of the invention the three-dimensional double fabric is made with single-weft, double-weft or three-weft binding.

The corresponding looms for making such double fabrics are set up for accommodating five or six warps, a basic and binding warp for upper and lower cloths, and in the case of single-weft and double-weft cloths for a pile warp and for two pile warps in the case of three-weft cloths.

The shuttles beat a beam beating means through the double shed either in long lay or in cross lay.

The two basic fabrics (upper and lower cloths), which may be used without using pile wires, are woven above each other with a spacing corresponding to the particular later use. These foundation or basic fabrics are connected by pile warp threads which can be made variable as regards density and length. The pile warp threads are led from one basic fabric into the other either by shafts or special machines and tied up by weft crossing. After subsequent consolidation by mechanical, thermal or chemical influence the two foundation or basic fabrics form the two cover structures of the lightweight construction sandwich.

In the sandwich the pile warps provide the stability in the third dimension. This achieves optimum mechanical properties with minimum density, which is one of the main requirements of reinforcing structures.

According to a preferred embodiment the double fabric is made by the velours method.

The heat aftertreatment of the finished double fabric, by which the fabric is consolidated, is carried out at temperatures above the glass transition temperature $T_G$ of the amorphous material of the polymer or polymers. The duration of said temperature aftertreatment also depends on the polymer material used.

According to a further embodiment the double fabric is first pretempered before this temperature aftertreatment, initially at temperatures beneath the glass transition temperature $T_G$ of the amorphous material of the polymer or polymers. In this case as well the temperature and duration of the pretempering depends on the polymer fibres polymer yarns used.

Depending on the nature of the polymer used, for consolidating the fabric the latter is drawn prior to the heat treatment in the longitudinal or transverse direction and during the heat aftertreatment above the glass transition point of the fibres or yarns used the fabric is allowed to shrink.

On conclusion or during this pretempering and this temperature aftertreatment the fabric can be additionally impregnated or chemically treated in other manner.

Depending on the intended use the preconsolidated or finished and subsequently treated fabric is cut into boards or pressed into corresponding mouldings. If the double fabric is pressed in mouldings after the pretempering the heat aftertreatment substantially coincides with the pressing operation.

For the pressing of sandwich lightweight construction shaped parts or mouldings from copolyimide fibres temperatures for example up to 400° C., preferably 335° C., are used. The pressing operation lasts about 90 minutes and is carried out at a pressure of 0.2 bar.

All the parameters such as temperature, time and pressure are interdependent in a manner peculiar to the materials and specific to the product. The finished lightweight construction material has a thickness of about 2.5 mm to 70 mm. However, other thicknesses may also be used.

The FIGURE shows the production of the double fabric 1 according to the invention which is disposed between two pile rails 9 which define the thickness of the double fabric.

The upper cloth 2 and the lower cloth 3 are formed by the main warps 6 and the binding warps 5 as well as the lower wefts 7 and upper wefts 8. The pile warp threads forming the core material are denoted by 4.

Depending on the type of use, the lightweight construction material can be made as sheet material, material cut to size or shaped component pretempered or fully shrunk and consolidated, representing an additional advantage over the known lightweight construction materials.

The production method also has further advantages regarding the further processing and the quality of the sandwich components because the gases normally arising in the pressing of the covering layers in the prior art are not enclosed in the sandwich but conducted away. Due to the fact that except for certain cases no resins need to be used to stiffen the lightweight structure, the gas formation is reduced to a minimum.

I claim:

1. Method of making a lightweight structural element, said method comprising:
   (a) providing a first cloth woven from fibers or yarns of amorphous polymeric material having a glass transition temperature and capable of being consolidated at temperatures above said glass transition temperature,
   (b) providing in spaced parallel relation to said first cloth a second cloth woven from fibers or yarns of amorphous polymeric material having a glass transition temperature and capable of being consolidated at temperatures above said glass transition temperature,
   (c) weaving into said first and second cloths between the facing surfaces thereof a pile warp of threads of amorphous polymeric material having a glass transition temperature and capable of being consolidated at temperatures above said glass transition temperature, thereby to provide a core between said spaced parallel first and second cloths,
   (d) heating the assembled first and second cloths and pile warp to a temperature above ambient and below the glass transition temperature of said amorphous polymeric material for a period of time sufficient to pretemper said assembled first and second cloths and pile warp,
   (e) elevating the temperature of the assembled first and second cloths and pile warp above the glass transition temperature of said amorphous polymeric material for a period of time sufficient to consolidate the assembled first and second cloths and pile warp thereby to make said lightweight structural element.

2. Method as in claim 1, said method further comprising:
   (f) after step (c) and prior to step (e), stretching the assembled first and second cloths and pile wrap in a direction parallel to said first and second cloths,
   (g) subsequent to step (e), permitting the assembled first and second cloths and pile wrap to shrink.

3. Method as in claim 1, wherein:
   (f) said amorphous polymeric material is a copolyimide,
   said method further comprising:
   (g) performing step (e) while pressing the assembled first and second cloths and pile wrap into a mold at a temperature of approximately 335° C. and a pressure of approximately 0.2 bar for approximately 90 minutes.

* * * * *